UNITED STATES PATENT OFFICE.

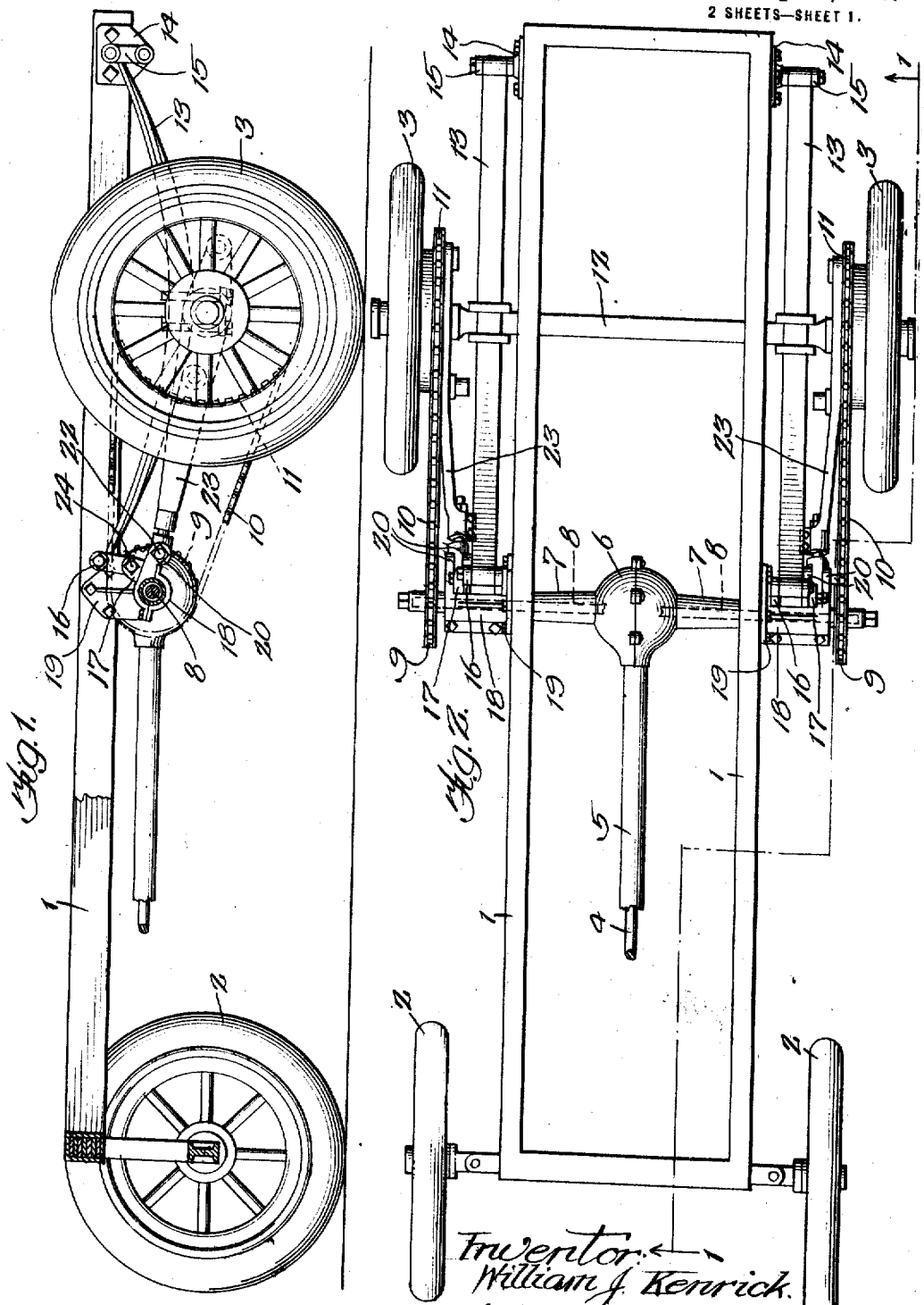

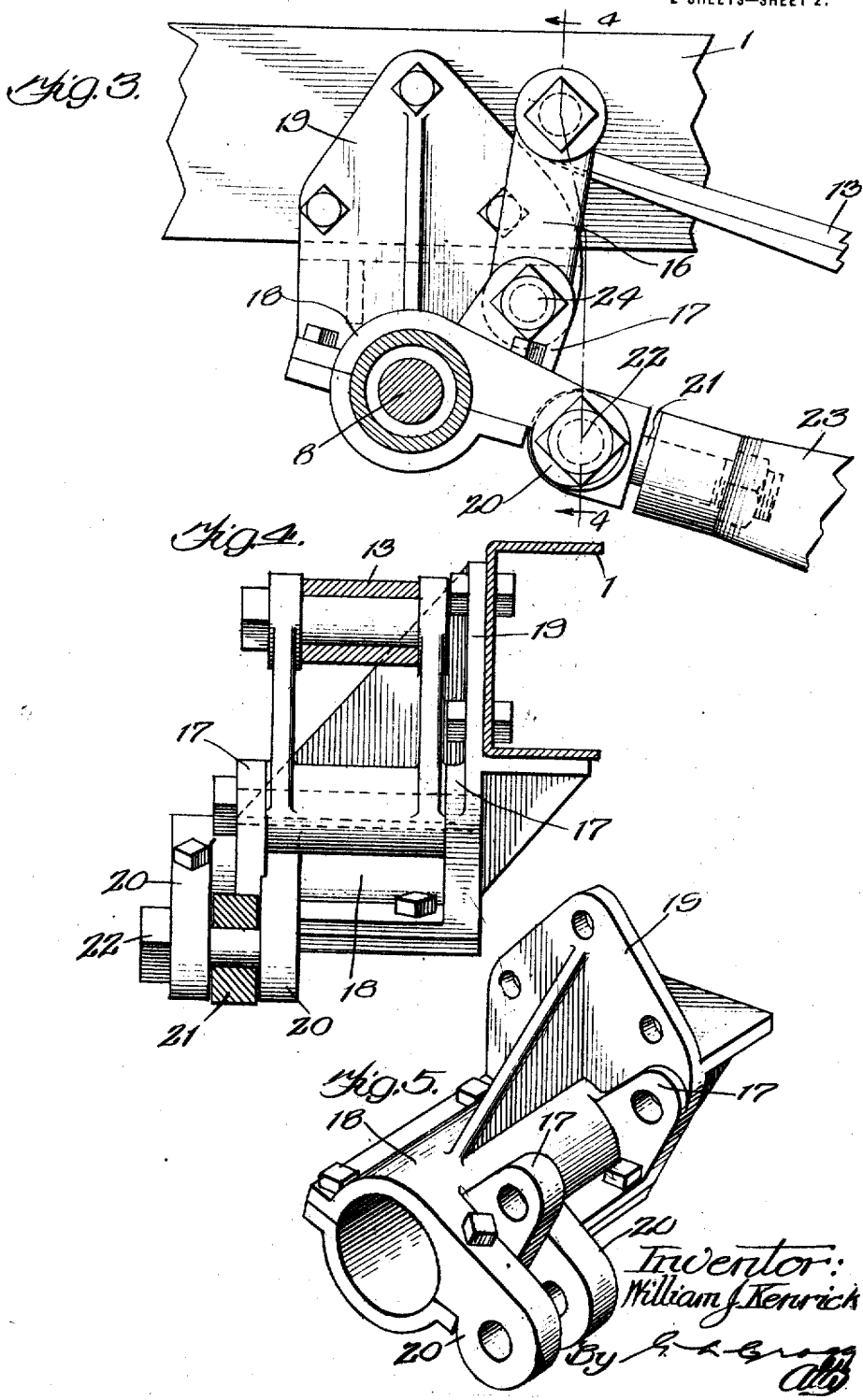

WILLIAM J. KENRICK, OF CHICAGO, ILLINOIS, ASSIGNOR TO DEARBORN MOTOR TRUCK COMPANY, OF CHICAGO, ILLINOIS, A CORPORATION OF ILLINOIS.

AUTOMOBILE.

1,261,034.  Specification of Letters Patent.  Patented Apr. 2, 1918.

Application filed July 10, 1916. Serial No. 108,356.

*To all whom it may concern:*

Be it known that I, WILLIAM J. KENRICK, citizen of the United States, residing at Chicago, in the county of Cook and State of Illinois, have invented a certain new and useful Improvement in Automobiles, of which the following is a full, clear, concise, and exact description, reference being had to the accompanying drawings, forming a part of this specification.

My invention relates to automobiles that employ jack shafts in driving connection with the traction wheels of automobiles and has for its object the provision of an improved association of the forward ends of radius arms and the forward ends of the springs that are employed to mount the automobile frame upon the traction wheels.

In accordance with one feature of the invention the radius arms are attached at their forward ends below the places of attachment of the forward ends of the springs and farther away from the jack shafts than the points of attachment of the forward ends of the springs. This result is desirably accomplished by means of radius arm supporting brackets carried by hangers for the jack shaft and spring supporting brackets also carried by these hangers, these latter brackets lying closer in toward the jack shaft than the former. In practising my invention I employ two pairs of brackets at each side of the automobile, one pair of brackets supporting the forward end of the contiguous radius arm and the other pair of brackets supporting the forward end of the contiguous vehicle body supporting spring, a bracket of one pair being interposed between the brackets of the other pair whereby the width of the space jointly occupied by such radius rod and spring is reduced. By means of my invention semi-elliptical springs may be mounted to have their ends substantially level and may be connected with the frame of the automobile by means of shackles that are of the same length. Different pins are employed for pivotally connecting the forward ends of the springs and the forward ends of the reach rods with the frame of the automobile whereby shorter and stronger bolts may be used. The radius arm supporting brackets are desirably formed in pairs and brackets which support the springs are desirably located in line with and above the spacing existing between the brackets of the pairs of brackets that support the radius arms whereby the length of the hangers which support the jack shaft may be reduced.

The invention has other features and advantages which will be better understood by reference to the accompanying drawings that fully illustrate the preferred form of the invention and in which drawings Figure 1 is a view of a portion of the structure illustrated in Fig. 2 on line 1 1 of Fig. 2; Fig. 2 is a plan view of sufficient portions of an automobile structure to illustrate the invention; Fig. 3 is a view of a part of the structure as it is shown in Fig. 1, on a larger scale; Fig. 4 is a view on line 4 4 of Fig. 3; and Fig. 5 is a perspective view of one of the hangers.

Like parts are indicated by similar characters of reference throughout the different figures.

The frame 1 of the automobile illustrated is supported at its forward ends upon front vehicle wheels 2 and at its rear upon traction wheels 3. As it will be understood, the frame 1 carries a vehicle body above it and supports a power plant, a part of a well known form of power plant being illustrated but to the employment of which the invention is not to be limited. The shaft 4 which transfers power from the internal combustion engine or other motor of the power plant has a tubular housing 5 that is merged with the differential gear housing 6 that in turn is provided with tubular continuations 7 that inclose the jack shaft 8 formed in sections that are united by gearing within the gear case 6 as is well understood by those skilled in the art. This jack shaft is shown as being provided with sprocket pinions 9 that are coupled by sprocket chains 10 with the traction wheels 3, these traction wheels carrying sprocket wheels 11 which are driven by the chains 10. These sprocket chains are adapted to drive the wheels 3 independently of each other, to which end these wheels are mounted to rotate upon the dead axle 12 which is clamped to the mid-portions of two semi-elliptical springs 13. The rear ends of these springs 13 are in flexible connection with the hangers 14 through the intermediation of shackles 15 which are pivotally connected at their upper ends with the rear ends of the springs 13 and which shackles are pivotally connected at their lower ends with portions of the hangers 14 that project below the level of the frame 1. The forward ends of the springs 13 are pivotally connected with the upper ends of shackles 16 whose lower ends are pivotally connected to brackets 17. The points of connection of the lower ends of the shackles 15 and 16 with the brackets and hangers supporting them are substantially equally distant below the frame 1 whereby the semi-elliptical springs 13 may have their ends substantially in the same level. The brackets 17 are desirably projected from the hangers 18 that are provided for the jack shaft 8, these hangers projecting laterally from brackets 19 that are bolted to the side members of the frame 1. Each of these hangers desirably carries a pair of brackets 20 between which the eye of a swivel eye bolt 21 is disposed, the shank of the pin 22 passing through the brackets 20 and said eye to afford a pivotal mounting for the eye bolt which is a structural part of a radius arm 23. The radius arms are connected with the rear wheels 3 in the usual way for the well known purpose of preserving the distance between the common axis of the rear wheels and the axis of the shaft 8 as the frame 1 rises and falls with respect to said wheels. Hitherto the forward end of each radius arm and the forward end of the spring structure were attached to the frame by a single pin common to the radius arm and spring structure with the result that the forward end of the spring structure was too low and would not be on a level with the rear end of the spring structure unless that end were also mounted too low. By providing separate attachment for the spring structure and the forward end of the adjacent radius arm the forward end of the spring structure may be elevated a suitable distance with reference to the forward end of the radius arm and moreover the forward end of the spring structure is placed more nearly above the hanger 18 and is therefore more firmly mounted than if it were supported farther away from the hanger by means of a bolt having the location of the pin 22. A further advantage resides in the ability to employ shackles at both ends of each semi-elliptical spring that are equal in length to secure the desired level disposition of the spring. Also the lowered brackets 20 bring pins 22 substantially into line with the jack shaft axis and the centers of the driving wheels.

It will be observed that one of the shackle supporting brackets 17 lies between the radius arm supporting brackets 20 whereby the length of the hanger 18 may be shortened a distance equal to the width of one of the brackets 20 as the shackle supporting and pivoting pin 24 overlies this particular bracket 20 a sufficient distance above the same to permit the corresponding shackle 16 to overlie this bracket 20.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. An automobile including the frame thereof; traction wheels; springs by means of which said frame is supported upon the traction wheels; a jack shaft in driving connection with the traction wheels; radius arms extending between the traction wheels and the jack shaft; and hangers for the outer ends of the jack shaft, each hanger being provided with a pair of spaced apart brackets between which the forward end of the associate radius arm is disposed and other brackets that support the forward ends of the adjacent spring and one of which latter brackets is located between the brackets of the aforesaid radius arm supporting pair of brackets, the place of attachment of the forward ends of the springs to their supporting brackets being farther in toward the jack shaft than the place of attachment of the forward ends of the radius arms to their supporting brackets.

2. An automobile including the frame thereof; traction wheels; springs by means of which said frame is supported upon the traction wheels; a jack shaft in driving connection with the traction wheels; radius arms extending between the traction wheels and the jack shaft; and hangers for the outer ends of the jack shaft, each hanger being provided with a pair of spaced apart brackets between which the forward end of the associate radius arm is disposed and other brackets that support the forward end of the adjacent spring and one of which latter brackets is located between the brackets of the aforesaid radius arm supporting pair of brackets.

3. An automobile including the frame thereof; traction wheels; springs by means of which said frame is supported upon the traction wheels; a jack shaft in driving connection with the traction wheels; radius arms extending between the traction wheels and the jack shaft; and hangers for the outer ends of the jack shaft, each hanger being provided with a pair of spaced apart brackets between which the forward end of the associate radius arm is disposed and a pair of other brackets that support the forward end of the adjacent spring, a bracket of one pair being interposed between the brackets of the other pair.

In witness whereof, I hereunto subscribe my name this 13th day of June A. D., 1916.

WILLIAM J. KENRICK.

Witnesses:
G. L. CRAGG,
E. L. WHITE.